US008010408B2

(12) United States Patent (10) Patent No.: US 8,010,408 B2
Rubinstein et al. (45) Date of Patent: Aug. 30, 2011

(54) PACKETIZED ADVERTISING UTILIZING INFORMATION INDICIA

(75) Inventors: Walter M. Rubinstein, Bronx, NY (US); Simeon Marc Balban, Skokie, IL (US)

(73) Assignee: Walter M. Rubinstein, Bronx, NY (US)

( * ) Notice: Subject to any disclaimer, the term of this patent is extended or adjusted under 35 U.S.C. 154(b) by 79 days.

(21) Appl. No.: 12/576,276

(22) Filed: Oct. 9, 2009

(65) Prior Publication Data

US 2011/0087539 A1 Apr. 14, 2011

(51) Int. Cl.
*G06Q 30/00* (2006.01)
(52) U.S. Cl. ............ 705/14.64; 235/462.01; 235/472.01
(58) Field of Classification Search .................... 705/14
See application file for complete search history.

(56) References Cited

U.S. PATENT DOCUMENTS

| | | | | |
|---|---|---|---|---|
| 5,869,819 | A * | 2/1999 | Knowles et al. | 235/375 |
| 5,978,773 | A * | 11/1999 | Hudetz et al. | 705/23 |
| 7,113,094 | B2 * | 9/2006 | Garber et al. | 340/572.4 |
| 7,314,178 | B2 * | 1/2008 | Rines et al. | 235/472.01 |
| 7,775,440 | B2 * | 8/2010 | Silverbrook et al. | 235/472.01 |
| 7,918,400 | B2 * | 4/2011 | Baltuch | 235/472.01 |
| 2001/0027409 | A1 * | 10/2001 | Sasaki et al. | 705/10 |
| 2001/0054008 | A1 * | 12/2001 | Miller et al. | 705/26 |
| 2001/0054009 | A1 * | 12/2001 | Miller et al. | 705/26 |
| 2001/0054067 | A1 * | 12/2001 | Miller et al. | 709/203 |
| 2002/0004753 | A1 * | 1/2002 | Perkowski | 705/26 |
| 2002/0079368 | A1 * | 6/2002 | Hankins | 235/383 |
| 2002/0143860 | A1 * | 10/2002 | Catan | 709/203 |
| 2002/0195495 | A1 * | 12/2002 | Melick et al. | 235/462.01 |
| 2003/0111531 | A1 * | 6/2003 | Williams | 235/383 |
| 2003/0119447 | A1 * | 6/2003 | Fisher et al. | 455/41 |
| 2003/0158792 | A1 * | 8/2003 | Perkowski | 705/27 |
| 2004/0056091 | A1 * | 3/2004 | Overhultz et al. | 235/382 |
| 2004/0133786 | A1 * | 7/2004 | Tarbouriech | 713/185 |
| 2004/0143497 | A1 * | 7/2004 | Hayashi et al. | 705/14 |
| 2005/0009564 | A1 * | 1/2005 | Hayaashi et al. | 455/558 |
| 2005/0055281 | A1 * | 3/2005 | Williams | 705/26 |
| 2005/0219051 | A1 * | 10/2005 | Nedblake | 340/572.1 |
| 2005/0237201 | A1 * | 10/2005 | Nedblake | 340/572.8 |
| 2006/0124742 | A1 * | 6/2006 | Rines et al. | 235/462.01 |
| 2007/0017992 | A1 * | 1/2007 | Burger et al. | 235/462.01 |
| 2007/0162350 | A1 * | 7/2007 | Friedman | 705/26 |
| 2007/0189579 | A1 * | 8/2007 | Crookham et al. | 382/100 |
| 2008/0270219 | A1 * | 10/2008 | Antinori | 705/10 |
| 2009/0225000 | A1 * | 9/2009 | Rosander et al. | 345/2.3 |

OTHER PUBLICATIONS

Alapetite, Alexandre. "Dynamic 2D-barcodes for multi-device Web session migration including mobile phones," Department of Management Engineering, Technical University of Denmark, Apr. 2, 2009.*

(Continued)

*Primary Examiner* — Michelle Tarae
(74) *Attorney, Agent, or Firm* — Gifford, Krass, Sprinkle, Anderson & Citkowski, P.C.

(57) ABSTRACT

A method and system for packetized advertising carried out with machine readable and decodable information indicia, where the packetized advertisements are formed by associating any combination of a plurality of products and services with the information indicia. In response to a device capturing an image of the information indicia a universal resource locator (URL) is generated. The URL generates a webpage with a series of URL that correspond to the plurality of products and services that are associated with the captured information indicia.

33 Claims, 8 Drawing Sheets

OTHER PUBLICATIONS

Gao, Jerry Zeyu. "Understanding 2D-Barcode Technology and Applications in M-Commerce—Design and Implementation of a 2D Barcode Processing Solution," Computer Engineering Department, San Jose State University, 2007.*

Holmquist, Lars Erik. "Tagging the World," interactions, Aug. 2006.*

Khalifa, Hend. "Utilizing QR Code and Mobile Phones for Blinds and Visually Impaired People," Information Technology Department, College of Computer and Information Science, King Saud University, 2008.*

Liu, Zheng. "Print-to-Web Linking Technology Using a Mobile Phone Camera and its Applications in Japan," C4 Technology, Inc., 2007.*

Piersantelli, G. et al. "Use of 2D barcode to access multimedia content and the web from a mobile handset," IEEE, 2008.*

Rouillard, Jose. "Contextual QR Codes," IEEE, 2008.*

Ruzkio, Enrico et al. "Physical Posters as Gateways to Context-aware Services for Mobile Devices," IEEE, 2004.*

"Sprint Customers Get Instant Links to Mobile Information with 2D Barcode Solution from Scanbuy," Business Wire, Nov. 11, 2008.*

Schmidmayr, Paul et al. "What's the Power behind 2D Barcodes? Are they the Foundation of the Revival of Print Media?" Graz University of Technology, Sep. 5, 2008.*

Tsunoda, Fuminori et al. "Implementation of Interactive Poster 'SuiPo'," CHI, May 3, 2007.*

"Wapple turns print interactive; Wapple Canvas ZestTM automatically generates data matrix and QR codes to link print media to the mobile web," M2 Presswire, May 12, 2008.*

Jeon, Jonghong. "Technical Trends of Mobile Web 2.0: What Next?" WWW, Apr. 25, 2008.*

* cited by examiner

PACKETIZED ADVERTISING UTILIZING INFORMATION INDICIA

FIELD OF THE INVENTION

This invention relates to multimedia advertising, and more specifically, to improved delivery and distribution of product and service information via machine readable indicia.

BACKGROUND OF THE INVENTION

As societies continue to advance with the advent of new technologies, consumers have become increasingly mobile, and now enjoy the use of advanced communication and information devices. The advances in technology have provided advertisers with new mediums and channels to reach consumers. However, the advances in technology have also led to a fragmentation in the advertising market. It is now increasingly more difficult for advertisers to reach a mass audience. For example, in the early days of television there were only a handful of channels, which guaranteed an advertiser a captive audience. Furthermore, new entertainment devices have had an adverse effect on the ability of advertisers to reach their targets with traditional promotional methods.

Therefore, advertisers are constantly looking for new and innovative methods to reach consumers, and to provide meaningful and informative information to the consumer.

SUMMARY OF THE INVENTION

A method and system for packetized advertising carried out with machine readable and decodable information indicia, where the packetized advertisements are formed by associating any combination of a plurality of products and services with the information indicia. In response to a device capturing an image of the information indicia a universal resource locator (URL) is generated. The URL generates a webpage with a series of URL that correspond to the plurality of products and services that are associated with the captured information indicia.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
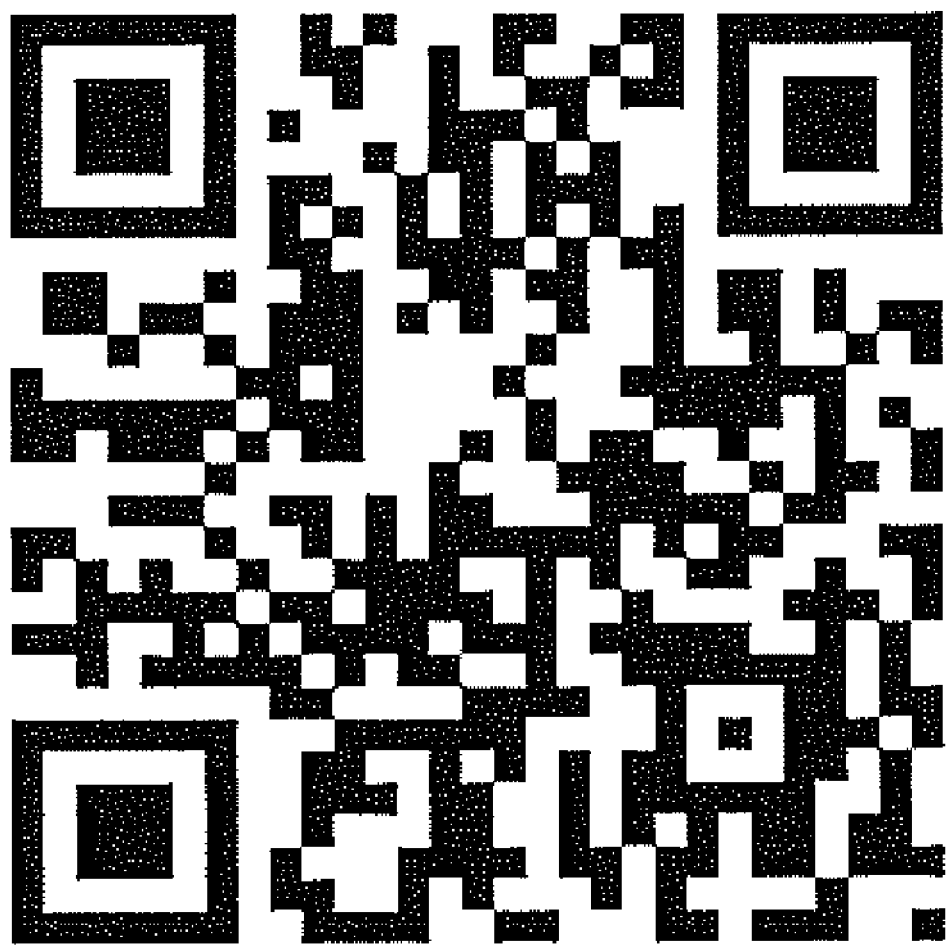
FIG. 1 is an illustration of a typical quick response (QR) code in the form of a two-dimensional bar code.

A recent advancement in advertising is the use of machine readable indicia for the acquisition of product information by a consumer. A quick response (QR) code is machine readable indicia in the form of a two-dimensional bar code. Initially used for tracking parts in vehicle manufacturing, QR Codes have now been adapted for applications aimed at mobile phone users. QR Codes storing addresses and Uniform Resource Locators (URLs) may appear in magazines, on signs, buses, business cards or just about any object that users might need information about. Users with a camera phone configured with the correct reader software may scan the image of the QR Code causing the phone's browser to launch and redirect to the programmed URL. FIG. 1 is an example of a QR code. In addition to QR codes, newer forms of two-dimensional barcodes have been developed that are more robust for image recognition and acquisition by the consumer, such as two-dimensional barcode indicia developed by Microsoft® Corporation.

Figure 2:
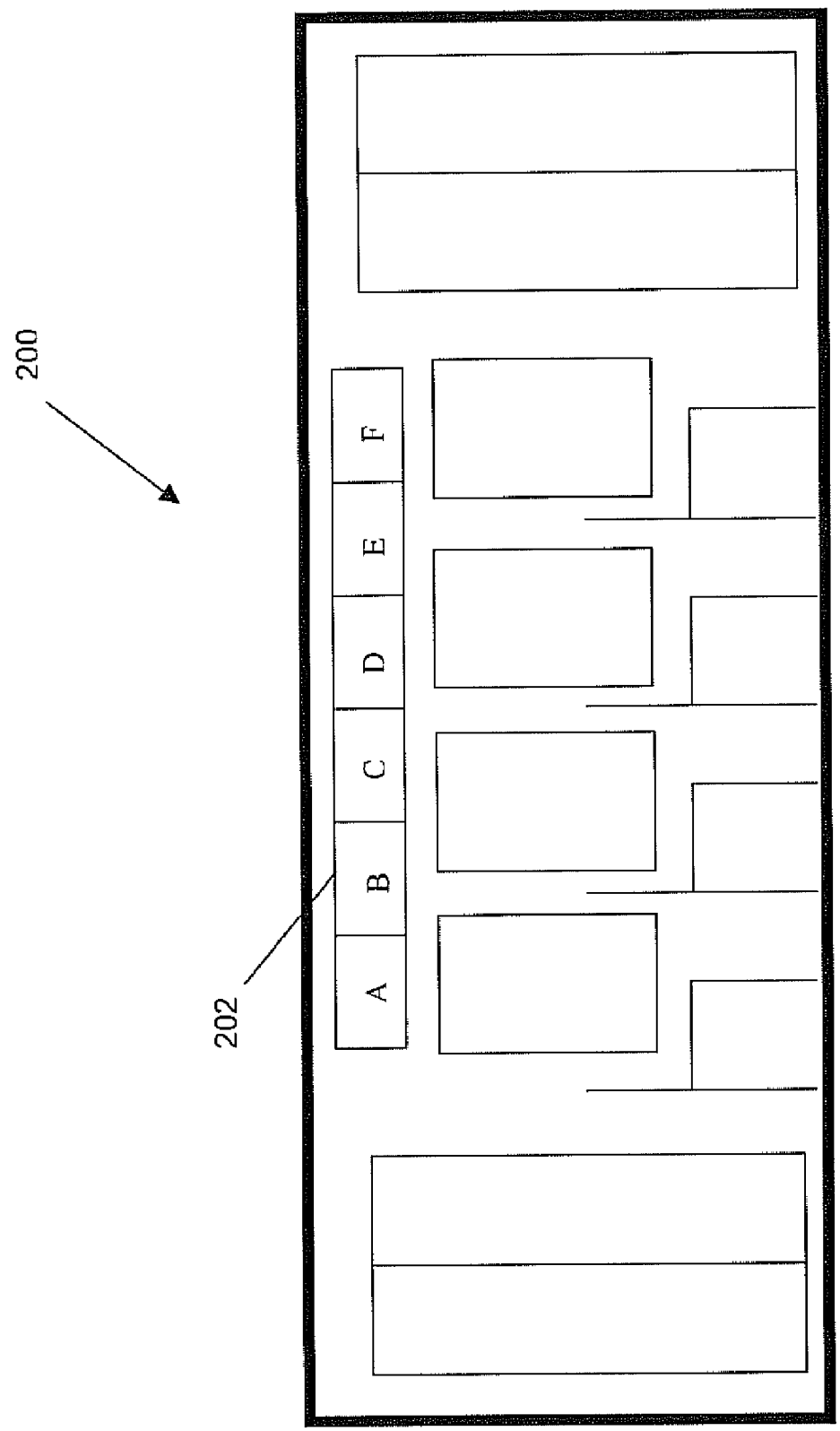
FIG. 2 is an interior view of a typical mass transit vehicle (MTV) with advertising placards.

An example of an environment in which machine readable indicia may be employed in a mass transit vehicle (MTV) 200, such as a subway train car or bus. FIG. 2 is an interior view of a typical mass transit vehicle (MTV) 200 configured with advertising placards 202 for products and services A to F.

MTV passengers are generally surrounded by advertising placards 202 positioned along the walls and ceilings of the MTV 200. However, due to less then optimal conditions, such as lack of time, crowding of space and vision field, a passenger may find it difficult to manually record contact information from one, and certainly more than one, of the placards positioned in the MTV 200 due to the aforementioned adverse conditions.

While the placards 202 positioned within the MTV 200 may be configured with indicia, including QR codes, to assist a passenger with acquisition of placard information, the aforementioned environment still presents a problem for the passenger to acquire information from one or more placards. Placards configured with individual information indicia, such as QR codes require a passenger to approach and take the image of the placard from a close range, however in a subway car, the desired placard may be several feet away, and are generally positioned six to eight feet from the floor. Additionally, ease of movement to approach and position a mobile device for image capture of a placard, especially in a crowded and fast moving MTV, is not always possible or practical. Moreover, mobile devices equipped with image capture, generally have low cost cameras or imaging units with a fixed focus. As a result unfocused QR images, obtained as a result of an inaccessible placard with the QR code may not be decodable. It is for these aforementioned reasons that QR codes or other types of machine readable indicia are presently not deployed on MTV.

Exemplary embodiments of the present invention provide an improved delivery and distribution of information utilizing machine readable indicia.

Figure 3:
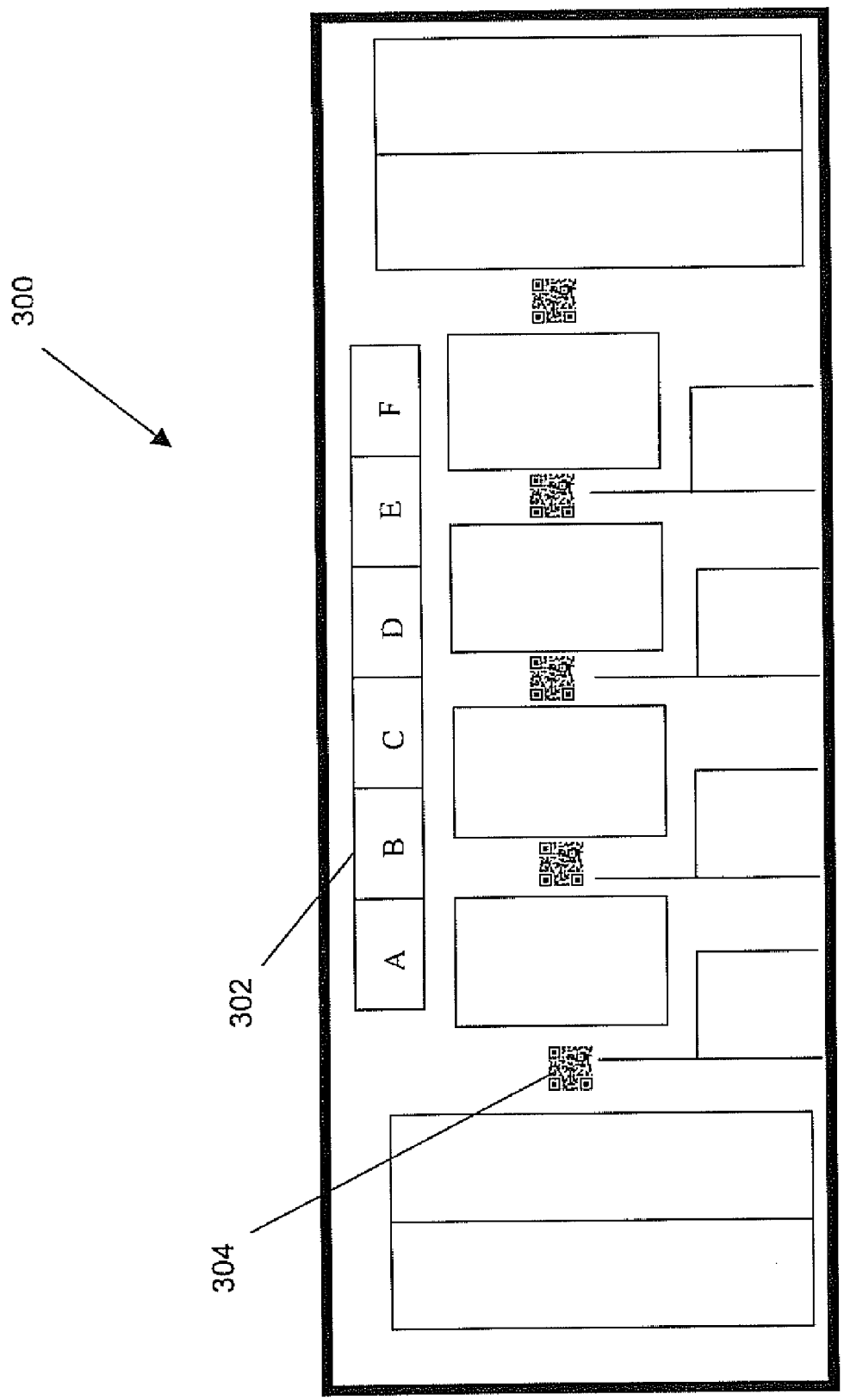
FIG. 3 is an interior view of a mass transit vehicle (MTV) with advertising placards with accompanying packetized information indicia according to embodiments of the invention.

FIG. 3 is an interior view of a mass transit vehicle (MTV) 300 with advertising placards 302, and accompanying packetized information indicia 304 positioned on the MTV 300 according to embodiments of the invention. The packetized information indicia 304 provide a full set, or packet, of advertising information for all the placards 302 for products and services A-F in a single machine readable indicia. The packetized information indicia 304 are conveniently located throughout the MTV, thereby facilitating image capture by passengers. Locations for placing the packetized information indicia 304 include the walls, ceilings, and seatbacks of an MTV. With embodiments of the invention, a passenger is not required to separately obtain information for each product or service A-F (302) of interest displayed in the MTV 300. By packetizing or grouping advertising information into single information indicia 304, the passenger may quickly obtain information for all the advertisements 302 within the MTV 300, and may at a later time select which of the advertisements A-F 302 included in the information packet to view.

The packetized information indicia, of embodiments of the invention, may be in the form of a QR code, a Microsoft® Tag, or other machine readable and decodable symbols. As a result of placing the packetized information indicia in multiple and convenient locations throughout the MTV, there is a stimulation of passenger response to advertising (SPARTA). Passengers or users are more likely to utilize their image capture device to obtain product and service information, due to their proximity to the information indicia. In addition, there are no two dimensional barcodes on any of the placards, thereby leaving the entire area of the placard for graphics or other information bearing content. Furthermore, by packetizing or grouping the advertising information, a passenger is not required to separately concentrate on obtaining information for each product or service, but may quickly obtain information for all products and services, and at a later time select which products or services to concentrate on. The use of packetized information indicia in MTV serve to reinforce sponsor's messages to riders, and is also an additional revenue source for the operator (e.g., a transit authority) of the MTV. Advertisers may be willing to pay to participate in the packetized information indicia (i.e., have their product or service listed), and the MTV operator can justify charging higher rates for successfully reaching more riders. The active recognition, capture, and consultation of the underlying product or service's website are readily measurable by the MTV operator, product or service sponsor, and advertising agency.

By encoding positional information into the packetized information indicia, MTV operators, product or service sponsors, and advertising agencies may make a determination of the effectiveness of an advertisement's placement on a specific mass transit line (e.g. bus line, train line, plane). Timing information in the form of a network time stamp may also be utilized to dynamically pinpoint the location of a rider, when they request information with their image capture device, thereby providing a better demographic understanding of the information requestor. Additionally, the time of image capture of the information indicia, by a user image capture device, may also be recorded so as to provide time stamp information in the event the user contacts the sponsor's website at a latter time. Advertisements that have a high frequency of rider requests for information will be deemed more effective, and similar or related products may be added to these lines. Conversely, advertisements that have a poor response may be eliminated from the line, or moved to a different transit route that may prove to be more effective. The improved ability to monitor the effectiveness of advertisements is an additional method to target market products and services.

As was explained earlier information indicia, such as a QR code are translated or decoded by an image capture device to obtain a universal resource locator (URL). In embodiments of the invention, a packetized information indicia has an assigned URL that is configured or associated with one or more underlying URLs that correspond to products and services to form a packetized advertisement.

Figure 4A:
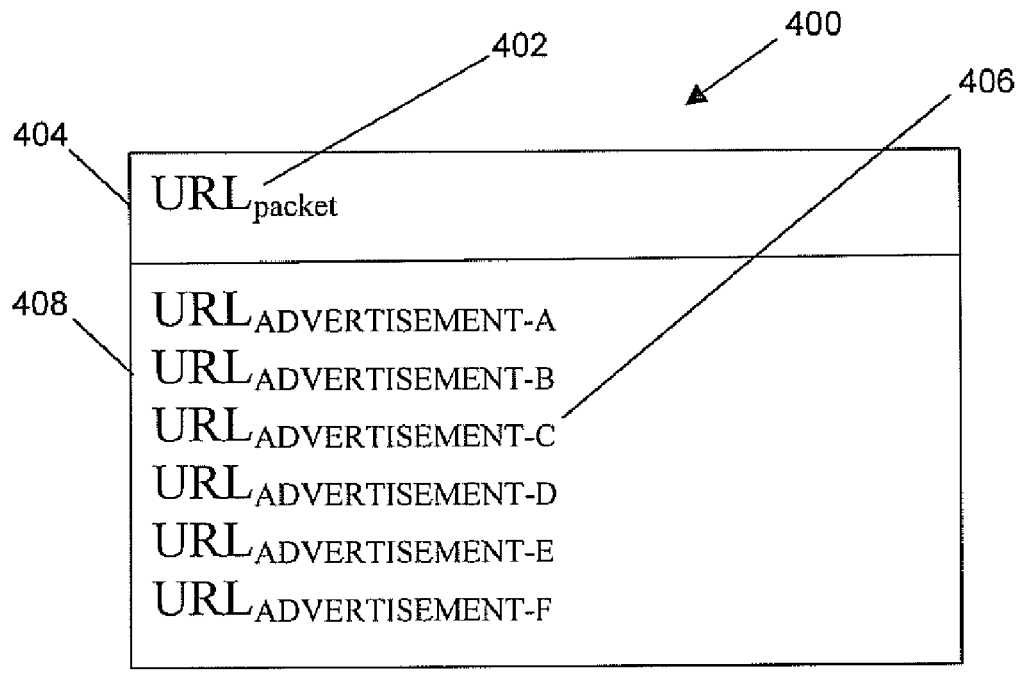
FIG. 4A is an example of a Internet browser with the a universal resource locator (URL) in the address field generated in response to reading the packetized information indicia, with corresponding packetized URLs in the browser display according to embodiments of the invention.

FIG. 4A is an example of a Internet browser page 400 with a universal resource locator (URL) for a packet 402 in the address field 404 generated in response to reading the packetized information indicia, with corresponding packetized URLs 406 in the browser display 408 according to embodiments of the invention.

Figure 4B:
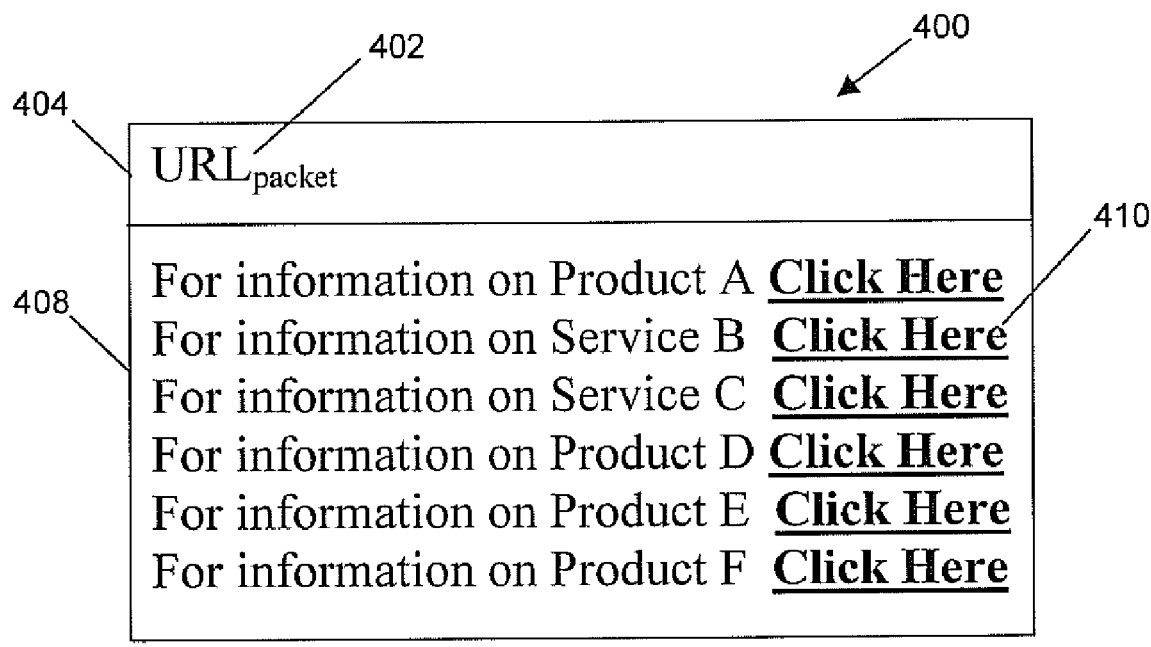
FIG. 4B is an example of a Internet browser with a universal resource locator (URL) in the address field generated in response to reading the packetized information indicia, with the corresponding packetized product or service name links appearing as a representative overlays of underlying URL in the browser display according to embodiments of the invention.

FIG. 4B is an example of an Internet browser page 400 with a universal resource locator (URL) for a packet 402 in the address field 404 generated in response to reading the packetized information indicia, with the corresponding packetized product or service name links 410 appearing as a representative overlays of underlying URL in the browser display 408 according to embodiments of the invention.

Figure 5A:
FIG. 5A is an example of a screenshot from a video display of a televised program's end credits with a packetized information indicia according to embodiments of the invention.

In addition to the placement of packetized information indicia on MTV, packetized information indicia may be broadcast in a video to a user. For example, a typical television show has several commercial breaks for advertising products and services. In many instances the viewer is overwhelmed by the stream of advertisements, and is unable to recall which products or services are of interest. In an embodiment of the invention, a packetized information indicia is displayed at the end of a program during the show's credits. The viewer may then capture an image of the packetized information indicia that contains links to the products or services advertised during the show. In another embodiment, the packetized information indicia may be run at the end of a network's primetime lineup just prior to a local newscast. With the advent of digital television (DTV) broadcasting, a separate sub channel may be dedicated to broadcasting the packetized information indicia, and viewer may be directed to tune into the sub channel to capture the packetized information indicia. The sub channel broadcasting the packetized information indicia would require a fraction of the bandwidth of a typical sub channel broadcasting audio/video (A/V) content or programming due to the static nature of the packetized information indicia (i.e., the image of the indicia is static or constant in consecutive frames of A/V content). In this instance, the packet of URLs or product and service links are those advertisements that ran during the primetime period. FIG. 5A is an example of a screenshot 500 from a video display of a televised program's end credits 502 with a packetized information indicia 504 with viewer instructions 506 according to embodiments of the invention. The use of packetized information indicia in televised programming serves to reinforce sponsor's messages to viewers, and is also an additional revenue source for the programmer. Advertisers may be willing to pay to participate in the packetized information indicia (i.e., have their product or service listed), and the programmer can justify charging higher rates for successfully reaching more viewers. The active recognition, capture, and consultation of the underlying product or service's website are readily measurable by the broadcaster, product or service sponsor, and advertising agency.

In addition to providing packetized advertising with packetized information indicia, at the end of a televised program or series of programs, for a corresponding collection of commercials for products or services, individual information indicia may also be associated and televised during each of the individual products' or services' commercials. The individual information indicia may be associated with shorter length commercials, usually televised during programming, or may be associated with infomercials that are longer commercials that are generally for a single individual product or service. The individual and packetized information indicia may refer a viewer to a sponsor's website, where besides obtaining further product or service information, or product promotions, such as coupons, the viewer may also be provided with a streaming version of the commercial that they have just viewed. In a further application, individual and packetized information indicia may be introduced to a viewer's display device, as an overlay, in the event the user/viewer fast forwards or skips through a commercial break, while using a video recorder, such as a digital video recorder (DVR), to watch recorded programming.

Figure 5B:
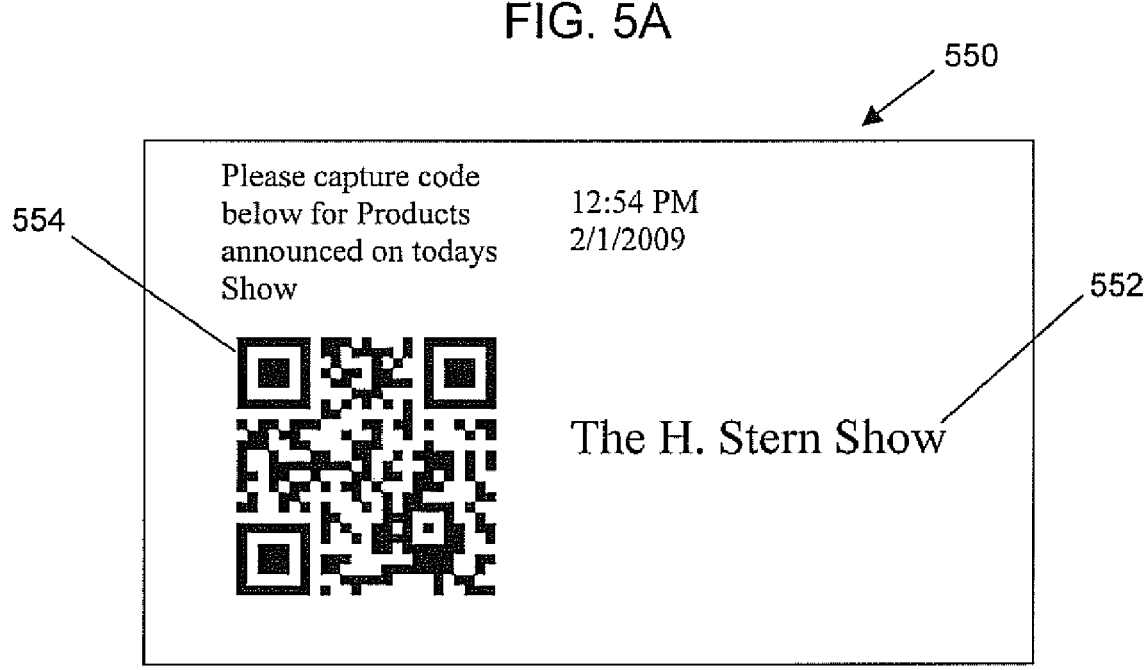
FIG. 5B is an example of a screenshot from a user interface display from a radio for presenting an audio program delivered by terrestrial, satellite, or Internet broadcast with a packetized information indicia according to embodiments of the invention.

FIG. 5B is an example of a screenshot of display 550 from a user interface from a radio for presenting an audio program delivered by terrestrial, satellite, or Internet broadcast with a packetized information indicia according to embodiments of the invention. It is now common for audio broadcasts to have visual program information on a listener's receiver. In embodiments of the invention, the display 550 has program information 552, as well as a packetized information indicia 554 for sponsors of the program. In an embodiment, a listener in their automobile may utilize their image capture device to record a packetized information indicia for later recall of information of products and services they heard during their time traveling in their car. For example, the radio listener may be directed to a product's website to view streaming video of a product they heard on the radio, but could not see.

Figure 6:
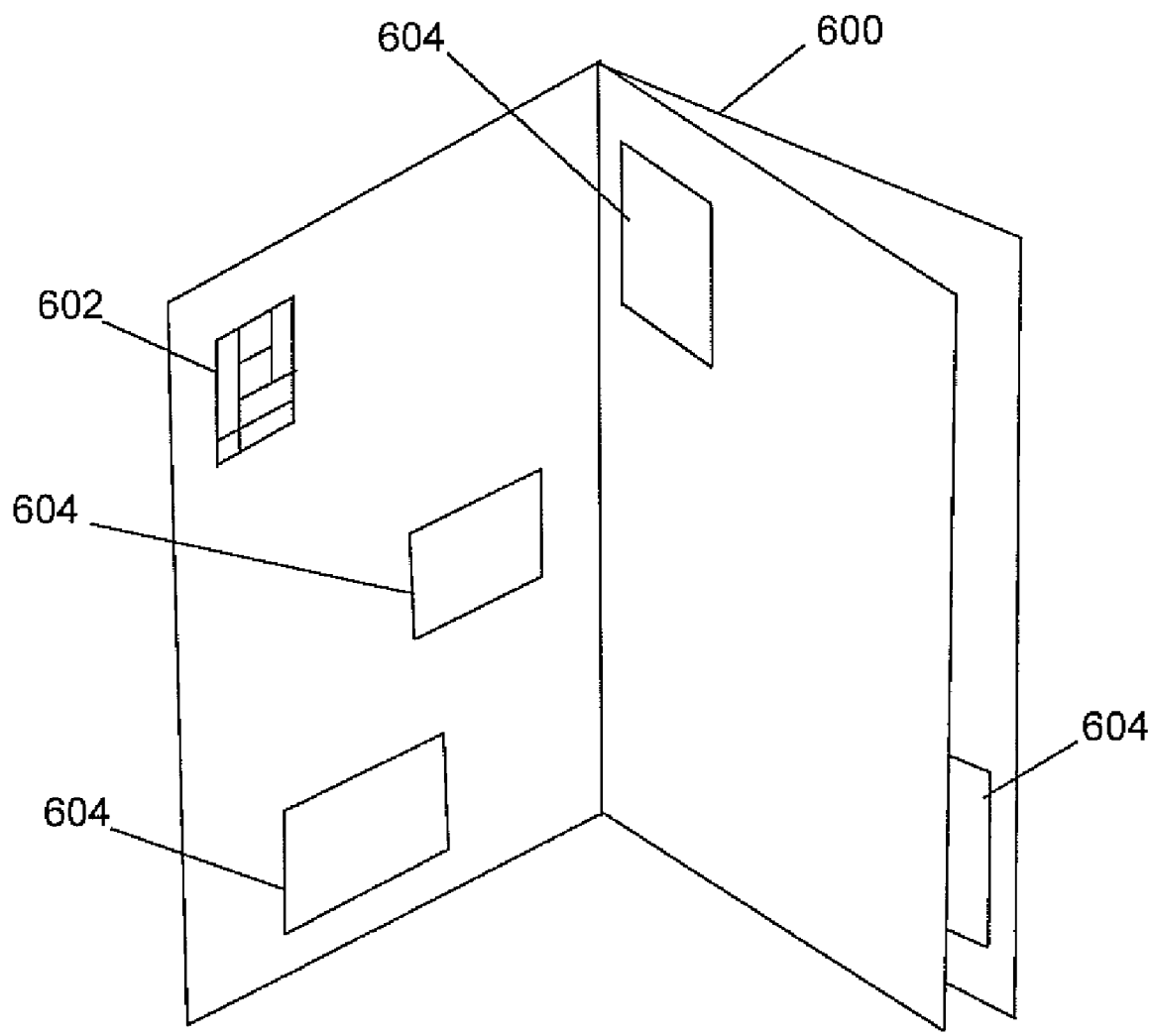
FIG. 6 is an example of a printed publication with a packetized information indicia according to embodiments of the invention.

FIG. 6 is an example of a printed publication 600 that has a packetized information indicia 602 according to embodiments of the invention. Printed publications, such as newspapers, periodicals, magazines, etc. typically have a series of advertisements for products and services that appear throughout the publication. In embodiments of the invention a series of advertisements that appear in a publication are assigned to a packetized information indicia. In the example of FIG. 6, advertisements $604_1$-$604_n$ (where n is any number greater than 1) are individual advertisements for products or services that are linked to the packetized information indicia 602. The packetized information indicia 602 may be printed in one or more locations within the publication 600, and a reader of the publication is notified or informed that capturing and decoding the packetized information indicia 602 will provide information about the products and services that appear in the publication 600. The use of packetized information indicia in publications serves to reinforce sponsor's messages to readers, and is also an additional revenue source for the publisher. Advertisers may be willing to pay to participate in the packetized information indicia (i.e., have their product or service listed), and the publisher can justify charging higher rates for successfully reaching more readers. The active recognition, capture, and consultation of the underlying product or service's website are readily measurable by the publisher, product or service sponsor, and advertising agency.

Figure 7:
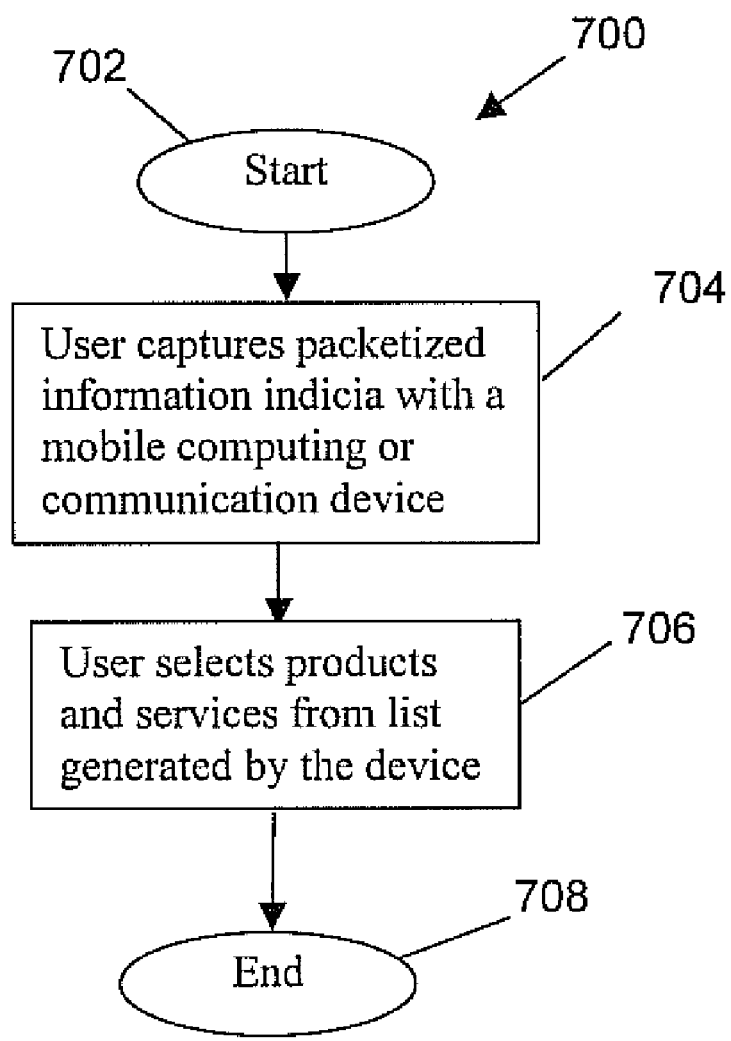
FIG. 7 is a flowchart of a client side method for an implementation of stimulating passenger response to advertising (SPARTA) according to embodiments of the invention.

FIG. 7 is a flowchart 700 of a client side method for an implementation of stimulating passenger response to advertising (SPARTA) according to embodiments of the invention. The process starts 702 with a user image capturing a packetized information indicia with their mobile computing or communication device (block 704). The device subsequently decodes the packetized information indicia to obtain a URL. The URL is used to reference a Web page with a listing of product and service URLs or links. The user utilizes the list to select products and services of interest (block 706), and the process concludes (block 708).

Figure 8:
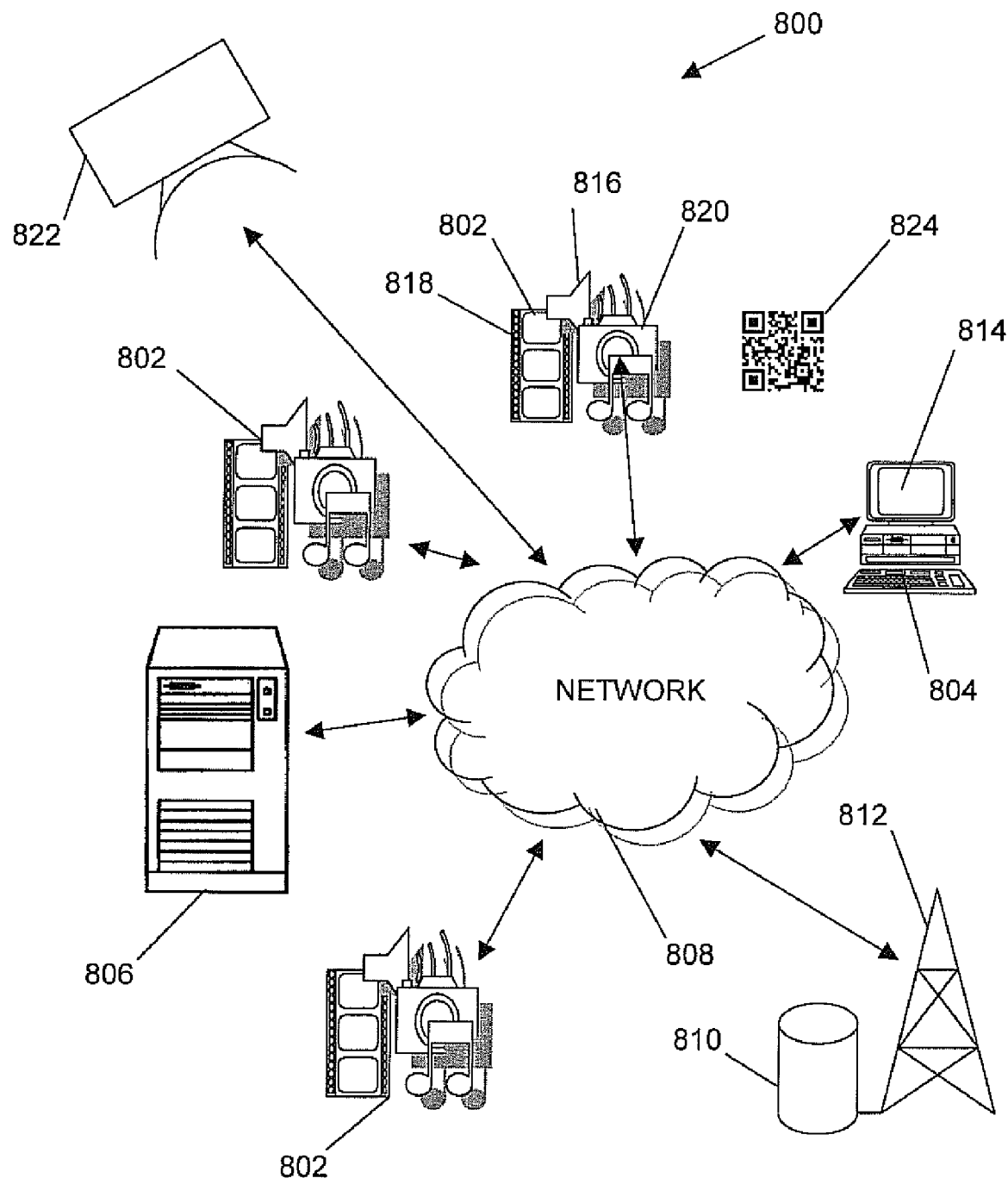
FIG. 8 is a block diagram of an exemplary system 800 configured for providing packetized advertising generated from information indicia according to embodiments of the invention.

FIG. 8 is a block diagram of an exemplary system 800 configured for providing packetized advertising generated from information indicia according to embodiments of the invention. The system 800 includes multimedia devices 802, and desktop computer devices 804 configured with display capabilities 814. The multimedia devices 802 may be mobile communication and entertainment devices, such as cellular phones and mobile computing devices that are wirelessly connected to a network 808. The multimedia devices 802 have audio outputs 816, video displays 818, and image capture capabilities 820. The image capture capabilities 820 may be used to capture the information indicia 824 for obtaining packetized advertising information. The multimedia devices 802 and desktop computer devices 804 may be configured with software with a GUI for carrying out the packetized advertising of embodiments of the invention. The network 808 may be any type of known network including a fixed wire line network, cable and fiber optics, over the air broadcasts, satellite 822, local area network (LAN), wide area network (WAN), global network (e.g., Internet), intranet, etc. with data/Internet capabilities as represented by server 806. Communication aspects of the network are represented by cellular base station 810 and antenna 812. In a preferred embodiment, the network 808 is a LAN and each remote device 802 and desktop device 804 executes a user interface application (e.g., web browser) to contact the server system 806 through the network 808. Alternatively, the remote devices 802 and 804 may be implemented using a device programmed primarily for accessing network 808 such as a remote client.

The packetized advertising software, of embodiments of the invention, may be resident on the individual multimedia devices 802 and desktop computers 804, or stored within the server 806 or cellular base station 810.

The antenna 812, satellite 822, or network 808 may be used by a system operator, such as a transit authority, to remotely change electronically alterable information indicia on a fleet of transit vehicles (e.g., train car, bus, etc.) to reflect an updated set of advertisements to be included in a packetized advertisement, as presented on the placards 302 on the MTV 300. Alternatively, the information indicia may remain static, and may just be printed indicia, and changes to the placards 302 will be reflected on the advertising website alone to which the printed information indicia refer. The antenna 812, satellite 822, or network 808 may also be used by media operators of radio and television for delivering or presenting information indicia for packetized advertising to radio listeners and television viewers as shown in FIGS. 5A and 5B.

The electronically alterable information indicia of embodiments of the invention may be formed from many display technologies, including, but not limited to liquid crystal display (LCD), plasma, organic light emitting diodes (OLED), electronic ink, and vacuum fluorescent, etc. In further embodiments of the invention, three dimensional barcodes may be utilized.

In a further embodiment, the packetized information indicia may be printed on a passenger's ticket stub, where a transportation service updates their Web site to reflect the current available advertisements appearing in their fleet of MTV. Additionally, ticket stubs to sporting, entertainment, and recreational events may also be configured with packetized information indicia for providing links to sponsor information for advertisements appearing at the stadium or theater venue.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method comprising:
    creating an information indicia within a particular environment containing a plurality of differing displays sponsored by different vendors each relating to a separate product or service provided by said different vendors, said environment comprising either a physically contiguous location in which said plurality of displays exist simultaneously or a media generator in which said displays are generated sequentially over time;
    creating a master database storing information relating to a series of products and services that are referenced by differing sets of displays appearing in a plurality of differing environments including said particular environment;
    capturing said information indicia with a computer peripheral device or a mobile communication device, said capturing device having a display and containing an application program operative to utilize said captured information indicia to communicate with said master database to retrieve stored information related to a set of products or services depicted or described in said plurality of displays existing in said particular environment; and
    generating information related to said set of products and services referenced by said plurality of displays in said particular environment on said capturing device display.

2. The method of claim 1, wherein said stored information comprises a plurality of universal resource locators (URL) that are individually and uniquely associated with each of said plurality of products and services; and
    wherein said method further comprises:
        generating a set of URL operative for user selection from said plurality of URL on said capturing device display corresponding to said set of products and services appearing in said particular environment.

3. The method of claim 1, wherein said stored information comprises a plurality of universal resource locators (URL) that are individually and uniquely associated with each of said plurality of products and services; and
    wherein said method further comprises:
        generating a set of written or visual descriptions with corresponding underlying URL operative for user selection for each of said set of products and services appearing in said particular environment on said capturing device display.

4. The method of claim 1, wherein said capturing is with a photographic device operative with said computer peripheral or said mobile communication device.

5. The method of claim 1, wherein said capturing is with a scanning device operative with said computer peripheral or said mobile communication device.

6. The method of claim 1, further comprising:
    placing one or more of said information indicia on or inside a mass transit vehicle that serves as said particular environment.

7. The method of claim 6, wherein said one or more information indicia are printed.

8. The system of claim 6, wherein said information indicia is printed on a ticket stub for admission to said particular environment or in a published media.

9. The method of claim 6, wherein said one or more information indicia are electronically alterable information indicia that are formed from display technologies, including, liquid crystal display (LCD), plasma, organic light emitting diodes (OLED), electronic ink, and vacuum fluorescent.

10. The method of claim 9, wherein said electronically alterable information indicia are remotely reconfigurable.

11. The method of claim 1, wherein
said information indicia is printed on a ticket stub for admission to said particular environment or in a published media.

12. The method of claim 1, wherein said method further comprises:
broadcasting said information indicia with said media generator via a radio or television broadcast for display on a user interface of a radio or on a television display, respectively;
wherein said radio or television broadcast is said particular environment; and
wherein said information indicia refers to a set of products and services presented or displayed during said radio and television broadcast, or sequentially generated during a defined time period.

13. The method of claim 1, wherein said information indicia comprise: a quick response (QR) code, a Microsoft® Tag, a machine readable and decodable symbol, two-dimensional bar code, and three-dimensional bar code.

14. The method of claim 1 further comprising:
determining with a software application the effectiveness of said plurality of differing displays and demographics of the one or more users by the placement of the information indicia, the frequency of user requests for said information indicia and said related set of products and services, and the timing of when a user captures said information indicia or requests said set of products or services.

15. A system comprising:
one or more information indicia replicated within a particular environment containing a plurality of differing displays sponsored by different vendors each relating to a separate product or service provided by said different vendors, said environment comprising either a physically contiguous location in which the plurality of displays exist simultaneously or a media generator in which the displays are generated sequentially over time;
a master database on a computer server storing information relating to a series of products and services that are referenced by differing sets of displays appearing in a plurality of differing environments including said particular environment; and
one or more computer peripheral or mobile communication devices configured for capturing said information indicia, said computer or communication peripheral having a screen display and containing an application program operative to utilize said captured information indicia to communicate with said master database to retrieve stored information related to a set of products or services depicted or described in said plurality of displays existing in said particular environment for display on said screen.

16. The system of claim 15, wherein said stored information comprises a plurality of universal resource locators (URL) that are individually and uniquely associated with each of said plurality of products and services; and
wherein said system further comprises:
a set of URL operative for user selection from said plurality of URL on said screen display corresponding to said set of products and services appearing in said particular environment.

17. The system of claim 15, wherein said stored information comprises a plurality of universal resource locators (URL) that are individually and uniquely associated with each of said plurality of products and services; and
wherein said system further comprises:
a set of written or visual descriptions with corresponding underlying URL operative for user selection for each of said set of products and services appearing in said particular environment on said screen display.

18. The system of claim 15 further comprising:
a software application on said computer server that determines the effectiveness of said plurality of differing displays, and demographics of one or more users by the placement of said information indicia, the frequency of user requests for said information indicia and said related set of products and services, and the timing of when a user captures said information indicia or requests said set of products or services.

19. The system of claim 15, wherein said capturing is with a photographic device operative with said computer peripheral or said mobile communication device.

20. The system of claim 15, wherein said capturing is with a scanning device operative with said computer peripheral or said mobile communication device.

21. The system of claim 15, wherein said information indicia is broadcast with said media generator via a radio or television broadcast for display on a user interface of a radio or on a television display, respectively;
wherein said radio or television broadcast is said particular environment; and
wherein said information indicia refers to a set of products and services presented or displayed during said radio and television broadcast, or sequentially generated during a defined time period.

22. The system of claim 15, wherein said information indicia comprise: a quick response (QR) code, a Microsoft® Tag, a machine readable and decodable symbol, two-dimensional bar code, and three-dimensional bar code.

23. The system of claim 15 further comprising a mass transit vehicle serving as the environment; and
wherein one or more replications of said information indicia are placed on or within said mass transit vehicle.

24. The system of claim 23, wherein said one or more information indicia are printed.

25. The system of claim 23, wherein said one or more information indicia are electronically alterable information indicia that are formed from display technologies, including, liquid crystal display (LCD), plasma, organic light emitting diodes (OLED), electronic ink, and vacuum fluorescent.

26. The system of claim 25, wherein said electronically alterable information indicia are remotely reconfigurable.

27. A machine-readable medium storing thereon one or more instructions, which when implemented cause a processor to implement a method for packetized advertising, the method comprising:
creating an information indicia within a particular environment containing a plurality of differing displays sponsored by different vendors each relating to a separate product or service provided by said different vendors, said environment comprising either a physically contiguous location in which said plurality of displays exist simultaneously or a media generator in which said displays are generated sequentially over time;
creating a master database storing information relating to a series of products and services that are referenced by differing sets of displays appearing in a plurality of differing environments including said particular environment;
capturing said information indicia with a computer peripheral device or a mobile communication device, said capturing device having a display and containing an application program operative to utilize said captured information indicia to communicate with said master database to retrieve stored information related to a set of products or services depicted or described in said plurality of displays existing in said particular environment; and generating information related to said set of products and services referenced by said plurality of displays in said particular environment on said capturing device display.

28. The machine-readable medium of claim 27, wherein said stored information comprises a plurality of universal resource locators (URL) that are individually and uniquely associated with each of said plurality of products and services; and wherein said method further comprises:

generating a set of URL operative for user selection from said plurality of URL on said capturing device display corresponding to said set of products and services appearing in said particular environment.

29. The machine-readable medium of claim 27, wherein said stored information comprises a plurality of universal resource locators (URL) that are individually and uniquely associated with each of said plurality of products and services; and wherein said method further comprises:

generating a set of written or visual descriptions with corresponding underlying URL operative for user selection for each of said set of products and services appearing in said particular environment on said capturing device display.

30. The machine-readable medium of claim 27, wherein said capturing is with a photographic device operative with said computer peripheral or said mobile communication device.

31. The machine-readable medium of claim 27, wherein said capturing is with a scanning device operative with said computer peripheral or said mobile communication device.

32. The machine-readable medium of claim 27, wherein said information indicia comprise: a quick response (QR) code, a Microsoft® Tag, a machine readable and decodable symbol, two-dimensional bar code, and three-dimensional bar code.

33. The machine-readable medium of claim 27 wherein the method further comprises:

determining with a software application the effectiveness of said plurality of differing displays and demographics of the one or more users by the placement of the information indicia, the frequency of user requests for said information indicia and said related set of products and services, and the timing of when a user captures said information indicia or requests said set of products or services.

* * * * *